United States Patent
Chelcea et al.

(10) Patent No.: US 7,197,582 B2
(45) Date of Patent: Mar. 27, 2007

(54) LOW LATENCY FIFO CIRCUIT FOR MIXED CLOCK SYSTEMS

(76) Inventors: Tiberiu Chelcea, 424 W. 119th St., Apartment 67, New York, NY (US) 10027; Steven M. Nowick, 350 Westview Ave., Leonia, NJ (US) 07605

( * ) Notice: Subject to any disclaimer, the term of this patent is extended or adjusted under 35 U.S.C. 154(b) by 364 days.

(21) Appl. No.: 10/258,221

(22) PCT Filed: Apr. 26, 2001

(86) PCT No.: PCT/US01/13777

§ 371 (c)(1),
(2), (4) Date: Jun. 2, 2003

(87) PCT Pub. No.: WO01/82053

PCT Pub. Date: Nov. 1, 2001

(65) Prior Publication Data

US 2004/0125665 A1    Jul. 1, 2004

Related U.S. Application Data

(60) Provisional application No. 60/199,851, filed on Apr. 26, 2000.

(51) Int. Cl.
*G06F 3/00*       (2006.01)
*G06F 13/00*      (2006.01)
(52) U.S. Cl. .............................. 710/57; 710/52; 710/55
(58) Field of Classification Search ............. 710/52–57
See application file for complete search history.

(56) References Cited

U.S. PATENT DOCUMENTS

| | | | | |
|---|---|---|---|---|
| 4,463,443 A | * | 7/1984 | Frankel et al. ................. | 710/60 |
| 5,809,521 A | | 9/1998 | Steinmetz et al. .......... | 711/116 |
| 5,867,541 A | * | 2/1999 | Tanaka et al. ............... | 375/354 |
| 5,937,010 A | * | 8/1999 | Petranovich et al. ........ | 375/295 |

(Continued)

FOREIGN PATENT DOCUMENTS

| WO | 0182064 | 11/2001 |
|---|---|---|
| WO | 0195089 | 12/2001 |

OTHER PUBLICATIONS

Written Opinion of International Preliminary Examining Authority of PCT/US01/13777 dated Jan. 27, 2004.

(Continued)

*Primary Examiner*—Kim Huynh
*Assistant Examiner*—Joshua D. Schneider
(74) *Attorney, Agent, or Firm*—Baker Botts, L.L.P.

(57) ABSTRACT

A FIFO design interfaces a sender subsystem and a receiver subsystem operating on different time domains. The sender subsystem and the receiver subsystem may be synchronous or asynchronous. The FIFO circuit includes a put interface configured to operate in accordance with the sender time domain and get interface configured to operate in accordance with the receiver time domain. The FIFO circuit includes an array of cells having a register and state controller indicative of the state of the cell. Each cell also has a put component part configured to operate according to the sender time domain including a put token passing circuit and put controller circuit. Each cell has get component part configured to operate according to the receiver time domain including a get token passing circuit and a get controller circuit. A mixed-clock relay station design interfaces a sender subsystem and a receiver subsystem working at different time domains, and where the latency between sender and receiver is large.

11 Claims, 9 Drawing Sheets

U.S. PATENT DOCUMENTS

| | | | | |
|---|---|---|---|---|
| 5,956,748 | A | 9/1999 | New | 711/149 |
| 5,982,772 | A * | 11/1999 | Oskouy | 370/395.7 |
| 6,523,060 | B1 * | 2/2003 | Kao | 710/54 |
| 2002/0069347 | A1 | 6/2002 | Singh et al. | 712/216 |
| 2003/0037096 | A1 | 2/2003 | Kao | |

OTHER PUBLICATIONS

Pham G N et al: "A high throughput, asynchronous, dual port FIFO memory implemented in ASIC technology" Proceedings of the Annual IEEE International ASIC Conference and Exhibit., Sep. 1989, pp. 3-1.1-3-1.4, XP010092548 Rochester, NY abstract p. 3-1.3, col. 1.

"Multi-Access First-in-First-Out Queue Using 370 Compare and Swap" IBM Technical Disclosure Bulletin, IBM Corp. New York, US, vol. 36, No. 2, Feb. 1, 1993, pp. 327-330, XP000354355 ISSN: 0018-8689 p. 329, line 16-p. 330, line 4.

Chelcea T et al: "Low-latency asynchronous FIFO's using token rings" Advance Research in Asynchronous Circuits and Systems, 2000. (ASYNC 2000). Proceedings. Sixth International Symposium on Eilat, Isreal Apr. 2-6, 2000, Los Alamitos, CA, USA IEEE Comput. Soc, US, Apr. 2, 2000, pp. 210-220, XP010377329 ISBN: 0-7695-0586-4 paragraph '02.1! paragraph '04.3!

Carloni L P et al: "A methodology for correct-by-construction latency insensitive design" Computer-Aided Design, 1999. Digest of Technical Papers. 1999 IEEE/ACM International Conference on San Jose, CA, USA Nov. 7-11, 1999, Piscataway, NJ USA, IEEE, US, Nov. 7, 1999, p. 309-315, XP010363870 ISBN: 0-7803-5832-5 abstract paragraph '05.!-paragraph '05.2!

Madsen J K et al: "A 2.5 GB/S ATM Add-Drop Unit for B-ISDN Based on a GAAS LSI" IEEE Journal of Solid-State Circuits, IEEE Inc. New York, US, vol. 31, No. 10, Oct. 1, 1996, pp. 1400-1405, XP000638087 ISSN: 0018-9200 figure 4.

D. S. Bormann, P.Y.K. Cheung "Asynchronous Wrapper for Heterogenous Systems", Proc. International Conference on Computer Design (ICCD), IEEE Computer Society Press. 1997, pp. 307-314.

D.M. Chapiro "Globally-Asynchronous Locally-Synchronous Systems", PhD Thesis, Stanford University, Oct. 1984.

R. Kol, R. Ginosar, "Adaptive Synchronization for Multi-Synchronous Systems", 1998 IEEE International Conferenc on Computer Design (ICCD'98), pp. 188-189, Oct. 1998.

M. R. Greenstreet, "Implementing a STARI Chip", Proc. International Conf. Computer Design (ICCD), pp. 38-43, IEEE Computer Society Press. 1995.

C.L. Seitz, "System Timing", Introduction to VLSI Systems, Ch. 7, Addison-Wesley, 1980.

J. Seizovic, "Pipeline Sychronization", Proc. International Symposium on Advanced Research in Asynchronous Circuits and Systems, pp. 87-96, Nov. 1994.

K.Y.Yun, R.P.Donohue "Pausible Clocking: A First Step Toward Heterogenous Systems", Proc. International Conference on Computer Design (ICCD), IEEE Computer Society Press. 1996.

* cited by examiner

LOW LATENCY FIFO CIRCUIT FOR MIXED CLOCK SYSTEMS

CROSS-REFERENCE TO RELATED APPLICATION

This application claims priority to U.S. Provisional Patent Application entitled "A Low-Latency FIFO For Mixed-Clock Systems," Ser. No. 60/199,851, which was filed on Apr. 26, 2000, which is incorporated by reference in its entirety herein.

BACKGROUND OF THE INVENTION

1. Field of the Invention

This invention relates to FIFO circuits, and more particularly to low latency FIFO designs that interface subsystems working at different speeds or between subsystems with very long interconnection delays.

2. Background of Related Art

A trend in VLSI is increasingly towards a "system-on-a-chip" involving many clock domains. A challenging problem is to robustly interface these domains. There have been few adequate solutions, especially ones providing reliable low-latency communication.

A number of FIFO designs and components have been developed to handle timing discrepancies between subsystems. Some designs are limited to handling single-clock systems. These approaches have been proposed to handle clock skew, draft, and jitter, and very long interconnect penalties.

Several designs have also been proposed to handle mixed-timing domains. One category of design approaches attempts to synchronize data items and/or control signals with the receiver, without interfering with its clock. In particular, Seizovic robustly interfaces asynchronous with synchronous environments through a "synchronization FIFO". (J. Seizovic, "Pipeline Synchronization," *Proceedings Internat'l Synposium on Advanced Research in Asynchronous Circuits and Systems*, pp. 87–96, November 1994.) However, the latency of his design is proportional with the number of FIFO stages, whose implementation includes expensive synchronizers. Furthermore, his design requires the sender to produce data items at a constant rate.

Other designs achieve robust interfacing of mixed-clock systems. However, these designs temporarily modify the receiver's clock. Synchronization failures are avoided by pausing or stretching the receiver's local clock. Each communicating synchronous system is wrapped with asynchronous logic, which is responsible for communicating with the other systems and for adjusting the clocks. This approach changes the local systems' clocks, and may introduce latency penalties in restarting them.

It is therefore an object of the invention to produce a low-latency, high-throughput FIFO design which robustly accommodate mixed-clock systems.

It is also an object of the invention to provide a mixed-clock systems in which only control signals are synchronized to avoid expensive synchronization.

SUMMARY OF THE INVENTION

These and other objects of the invention are accomplished by a novel low-latency FIFO design which interfaces the transmission of data items between a sender subsystem controlled by a first clock signal and a receiver subsystem controlled by a second clock signal. The FIFO is configured to stall when either a full signal or an empty signal is detected. The FIFO includes an array of cells. A full detector is controlled by the first clock signal and produces the full signal synchronized with the first clock signal which is asserted high when fewer than a predetermined number of cells in the array of cells are empty. An empty detector is controlled by the second clock signal and produces a first empty signal synchronized with the second clock signal when no fewer than a predetermined number of consecutive cells in the array of cells are fall. A get controller is configured to enable the data item to be dequeued when the first empty signal is high.

A deadlock detector is provided which produces a second empty signal synchronized with the first clock signal which is asserted when fewer than a predetermined number of cells in the array of cells are full and at least one cell in the array of cells has a valid data item. A put controller is configured to enable a dummy data item to be enqueued if the second empty signal is asserted high by the deadlock detector, resulting in a de-assertion of the first empty signal, thereby preventing the FIFO from stalling.

The FIFO design in accordance with the invention does not need data synchronization. As described above, it only synchronizes on a few global control signals. An embodiment of this FIFO design is able to interface between systems with long interconnect delays and different clock speeds.

Further features of the invention, its nature and various advantages will be more apparent from the accompanying drawings and the following detailed description of preferred embodiments.

BRIEF DESCRIPTION OF THE DRAWINGS

FIG. 5(*a*) is a schematic block diagram of another portion of the FIFO circuit illustrated in FIG. 2, in accordance with the invention.

FIG. 5(*b*) is a schematic block diagram of yet another portion of the FIFO circuit illustrated in FIG. 2, in accordance with the invention.

FIG. 5(*c*) is a schematic block diagram of a further portion of the FIFO circuit illustrated in FIG. 2, in accordance with the invention.

FIG. 6(*a*) is a schematic block diagram of a full detector of the FIFO circuit illustrated in FIG. 2, in accordance with the invention.

FIG. 6(*b*) is a schematic block diagram of an empty detector of the FIFO circuit illustrated in FIG. 2, in accordance with the invention.

FIG. 8(*a*) is a schematic block diagram of a full detector of the FIFO circuit illustrated in FIG. 7, in accordance with the invention.

DETAILED DESCRIPTION OF THE PREFERRED EMBODIMENTS

The exemplary FIFO circuits described herein mediate between two interfaces: a sender which produces data items and a receiver which consumes data items. It is implemented as a circular buffer of identical cells, where each cell communicates with the two systems on common data buses. The input and output behavior of a cell is dictated by the flow of two tokens around the ring: one for enqueuing data and one for dequeuing data. Data items are not moved around the ring once they are enqueued, thus providing the opportunity for low-latency; once a data item in enqueued, it is shortly thereafter available to be dequeued.

Figure 1:
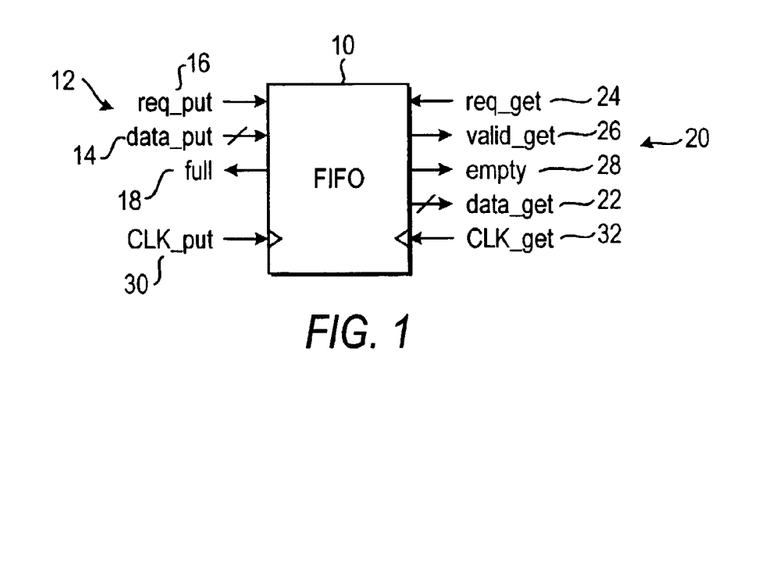
FIG. 1 is a schematic block diagram of an exemplary FIFO circuit, illustrating an interface with a sender and a receiver, in accordance with the invention.

Referring to the drawings, and in particular to FIG. 1, a FIFO 10 interfaces with two subsystems: a sender subsystem which produces data items, and a receiver subsystem which consumes the data items. A "put interface" 12 serves as an interface with the sender subsystem, and comprises a sender data bus 14 ($data_{put}$) which is used to send data items from the sender subsystem to the FIFO 10, a put request signal 16 ($req_{put}$), which transmits requests to enqueue a data item and also is used to indicate the validity of the enqueued data item, and a full signal 18 (full), which signals when the FIFO is full. The "get interface" 20 provides an interface to the FIFO circuit 10 with the receiver subsystem, and comprises a receiver data bus 22 ($data_{get}$), used to receive a data item to the receiver subsystem from the FIFO circuit 10, a get request signal 24 ($req_{get}$) to request to dequeue a dequeued data item, a validity signal 26 ($valid_{get}$), used to indicate the validity of a data item, and an empty signal 28 (empty) that indicates when the FIFO 10 is empty. In accordance with this embodiment, the two clocks, a send clock 30 ($CLK_{put}$) and receive clock 32 ($CLK_{get}$) are identical, (henceforth commonly referred to herein as clock 31 (CLK)).

The protocol with the sender subsystem may proceed as follows. When the sender wants to enqueue a data item, it places it on the sender data bus 14 ($data_{put}$) just after the positive edge of CLK signal and simultaneously asserts the put request signal 16 ($req_{put}$.) If data can be accepted, i.e., the FIFO 10 is not full, the data will be enqueued. When the FIFO 10 becomes full due to a request on put request signal 16 ($req_{put}$), the full signal 18 (full) will be asserted just after the next CLK signal edge. At that time, any subsequent pending request from the sender will not be satisfied. According to the protocol, the FIFO 10 will freeze the put token and the enqueuing operation, and the new data must be maintained by the sender until the full signal 18 (full) becomes 0.

The protocol with the receiver may proceed as follows: The receiver first issues a get request signal 24 ($req_{get}$=1) just after the positive edge of the CLK signal. If valid data is available, it will be placed on the receiver data bus 22 ($data_{get}$) before the next positive CLK signal edge, along with two status bits: validity signal 26 ($valid_{get}$) and empty signal 28 (empty), and latched by the receiver on that edge.

There are four possible values of validity signal 26 ($valid_{get}$) and empty signal 28 (empty) in response to a get request signal 24 ($req_{get}$). Two cases occur when valid data is dequeued: (1) validity signal 26 ($valid_{get}$)=1 and empty signal 28 (empty)=0, i.e., the FIFO 10 has dequeued valid data and is not empty; (2) validity signal 26 ($valid_{get}$)=1 and empty signal 28 (empty)=1, i.e., the FIFO 10 has dequeued the last valid data item; it freezes the get token, and any new request from the receiver is ignored until the empty signal 28 (empty)=0. The two remaining cases occur when no valid data is available: (3) validity signal 26 ($valid_{get}$)=0 and empty signal 28 (empty)=0, i.e., the FIFO 10 returned a dummy (invalid) data item, and is not empty; or (4) validity signal 26 ($valid_{get}$)=0 and empty signal 28 (empty)=1, i.e., either (a) the FIFO 10 returned no valid data (FIFO 10 is empty and stalled), or (b) it returned a dummy (invalid) data item and has then just become empty. Case 4(a) applies to a single-clock FIFO 10, when the FIFO is completely empty and cannot process a pending get request. Cases 3 and 4(b) will be discussed with respect to a mixed-clock embodiment of the FIFO, below, wherein both valid and invalid ("dummy") data items are allowed.

Figure 2:
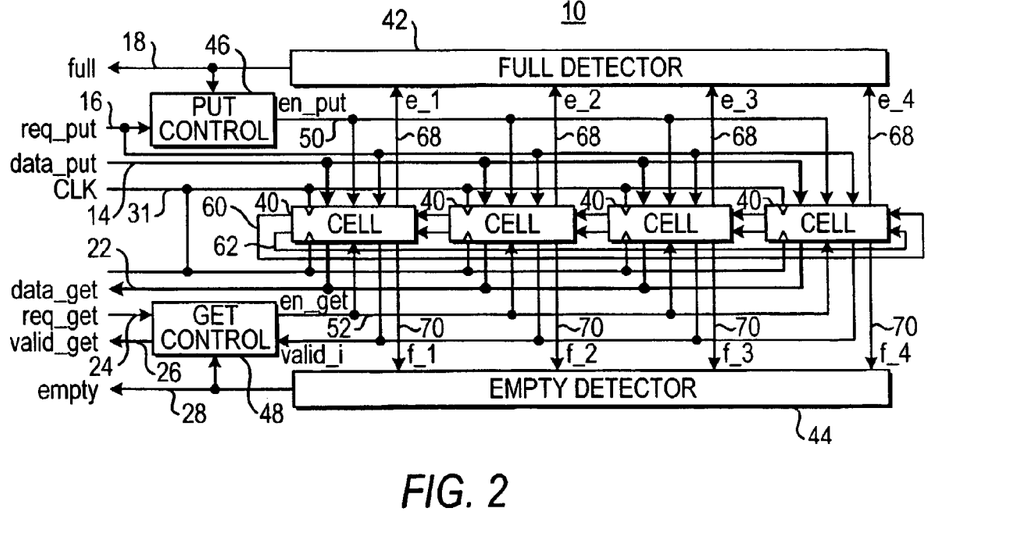
FIG. 2 is a more detailed schematic block diagram of the exemplary FIFO circuit illustrated in FIG. 1, in accordance with the invention.

FIG. 2 illustrates the basic architecture of a 4-place single clock FIFO 10 in accordance with the invention. FIFO 10 comprises a circular array of cells 40, which may be substantially identical, a full detector 42, an empty detector 44, control logic for the put operation 46, and control logic for the get operation 48. The full detector 42 and empty detector 44 observe the state of the FIFO 10 and determine whether the FIFO 10 is full or empty. The input and output behavior of the FIFO 10 is controlled by the flow of two tokens, i.e., a put token, used to enqueue data items, and a get token, used to dequeue data items. Once a data item is enqueued, it is not moved until it is dequeued. Thus the FIFO 10 provides low latency: once a data item is input, it is almost immediately available for output.

The put controller 46 enables and disables the put operations. If its output is asserted, the FIFO 10 enqueues one data item and rotates the put token to the left. If it is deasserted, the put interface is stalled. The get controller 48 operates in a substantially identical manner to enable and disable the get operations.

Tokens move counterclockwise through the array of cells 40. As is well-known in the art, the cell 40 containing the put token, i.e., the tail of the queue, has permission to enqueue a data item. Similarly, the cell with the get token, i.e., the head of the queue, has the permission to dequeue its data. The get token is never ahead of the put token. Once a cell has used a token, it will pass it to its left neighbor at the beginning of the next clock cycle, after the respective operation is completed. The token movement may be controlled both by the global put request signal 16 ($req_{put}$) and the global get request signal 24 ($req_{get}$), as well as the state of the FIFO 10, i.e., the full signal 18 (full) and the empty signal 28 (empty), which are combined into the global put signal 50 ($en_{put}$) and global get signal 52 ($en_{get}$).

Figure 3:
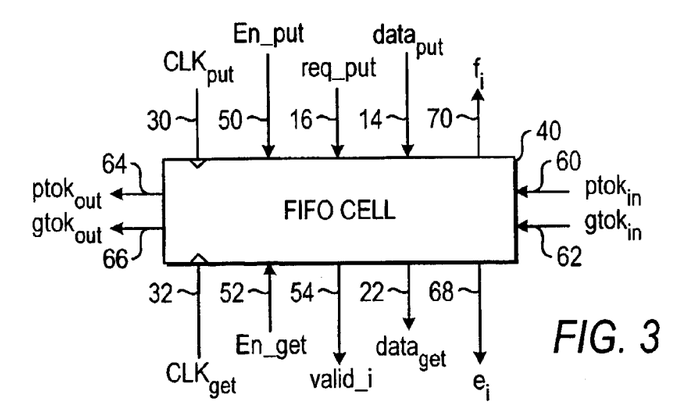
FIG. 3 is enlarged schematic block diagram, illustrating a portion of the FIFO circuit of FIG. 2, in accordance with the invention.

A block diagram of an individual cell 40 is illustrated in FIG. 3. Each cell 40 communicates with the put interface 12 on sender data bus 14 ($data_{put}$) to receive data to the cell 40, global put signal 50 ($en_{put}$), i.e., the request for the put operation from the put controller, and the put request signal 16 ($req_{put}$), which indicates valid data enqueued. (According to the embodiment of FIGS. 2–5, only valid data items are enqueued. However, other embodiments of the invention, such as mixed clock FIFO 100 described below, may incorporate invalid or "dummy" data as well.) Similarly, cell 40 communicates with the get interface 20 on receiver data bus 22 ($data_{get}$), which is used to output a data item from the cell, valid bus 54 ($valid_i$), which indicates the cell 40 contains valid data, and global get signal 52 ($en_{get}$), i.e., the control for the get operation from the get controller 48 (FIG. 2). In addition, the single clock is tied to both $CLK_{put}$ 30 and $CLK_{get}$ 32. Each cell 40 receives put tokens on put token input 60 ($ptok_{in}$) and receives get tokens on get token input 62 ($gtok_{in}$) from the right cell and passes the tokens on put token output 64 ($ptok_{out}$) and get token output 66 ($gtok_{out}$) to the left cell. The state of each cell 40 is communicated to the full detector 42 by asserting empty output 68 ($e_i$) high when the cell is empty, and to the empty detector 44 by asserting full output 70 ($f_i$) high when the cell is full.

Figure 4:
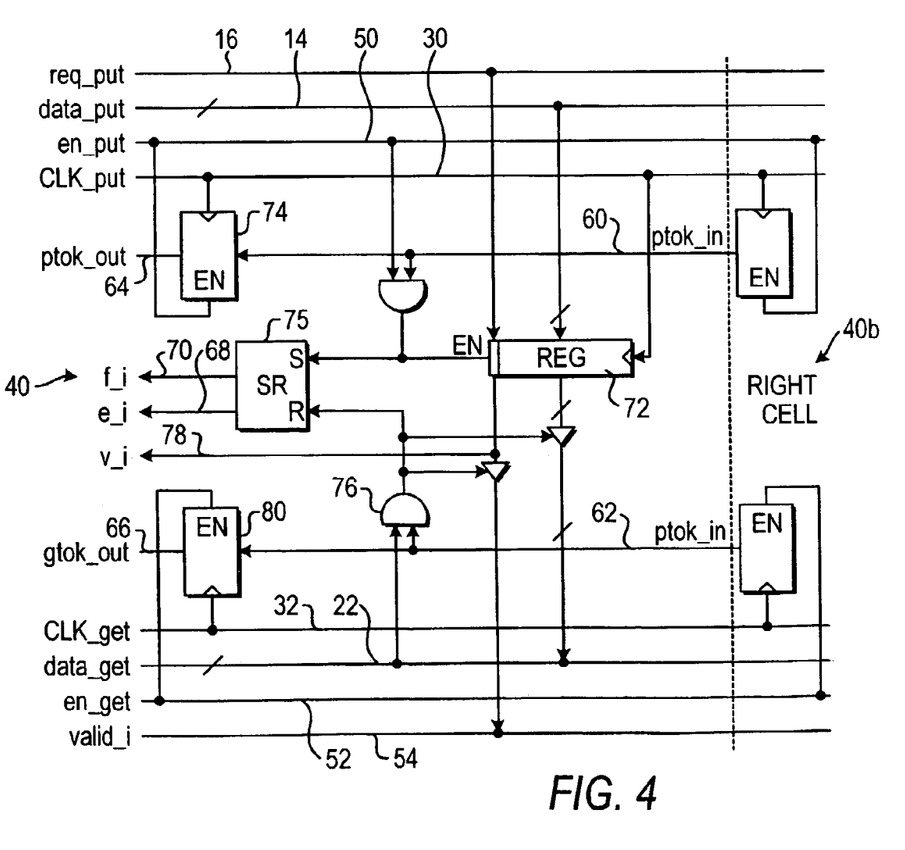
FIG. 4 is a more detailed schematic block diagram of the portion of the FIFO circuit illustrated in FIG. 3, in accordance with the invention.

FIG. 4 illustrates cell 40 in greater detail. Initially, the cell 40 starts in an empty state ($e_i$=1 and $f_i$=0) and without any tokens. The cell 40 waits to receive the put token from the right cell 40b on the positive edge of $CLK_{put}$ 30, and waits for the sender to place a valid data item on the sender data bus 14 ($data_{put}$). A request to enqueue a data item is indicated to all cells by global put signal 50 ($en_{put}$=1), which is the output of the put controller 46, and the validity of the data is indicated by global put request signal 16 ($req_{put}$). When there is valid data, the cell 40 performs three actions: (a) it enables the register 72 (REG) to latch the data item and also a data validity bit (which is $req_{put}$), (b) it indicates that the cell has a valid data item (asynchronously sets $f_i$=1), and (c) it enables the upper left ETDFF 74 ($en_{put}$=1) to pass the put token to the left cell (not shown). On the positive edge of the next clock cycle, the data item and validity bit are finally latched and the put token is passed to the left cell.

The behavior for dequeuing data is substantially similar, with the differences noted herein. The cell 40 waits to receive the get token, i.e., get token input 62 ($gtok_{in}$)=1, and waits for the receiver to request a data item, global get signal 52 ($en_{get}$)=1, the output of the get controller 48. When both conditions hold (at AND gate 76), the cell 40 performs several actions: it (a) enables the broadcasting of the data item on the receiver data bus 22 ($data_{get}$) and the broadcasting of v_i 78 (the latched $req_{put}$) on the valid bus 54, (b) indicates that the cell is empty (asynchronously sets empty output 68 ($e_i$)=1), and (c) enables the lower left ETDFF 80 to pass the get token. At the beginning of the next clock cycle, the get token is then passed to the left cell.

Figure 5A:
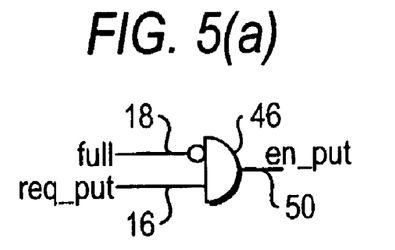
Figure 5B:
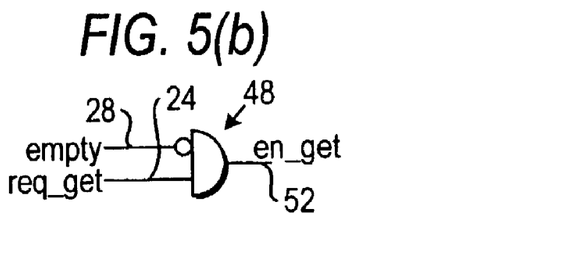
Figure 5C:
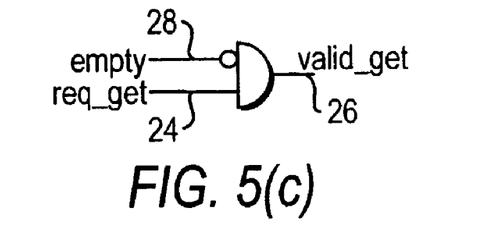

The implementation of the put and get controllers is illustrated in FIGS. 5(a)–5(c). The put controller 46, illustrated in FIG. 5(a), enables and disables the put operation and the movement of the put token in the FIFO 10. The put controller 46 is implemented such that these operations are only enabled when there is a request to enqueue a data item on global put request signal 16 ($req_{put}$), and the FIFO is not full. As illustrated in FIGS. 5(b)–5(c), the get controller 48 enables and disables the get operation and the movement of the get token in the FIFO. They are only enabled when there is a global get request signal 24 ($req_{get}$) from the receiver and the FIFO is not empty. The simple AND gate implementations in FIGS. 5(a)–5(c) correspond exactly to these conditions.

Figure 6A:
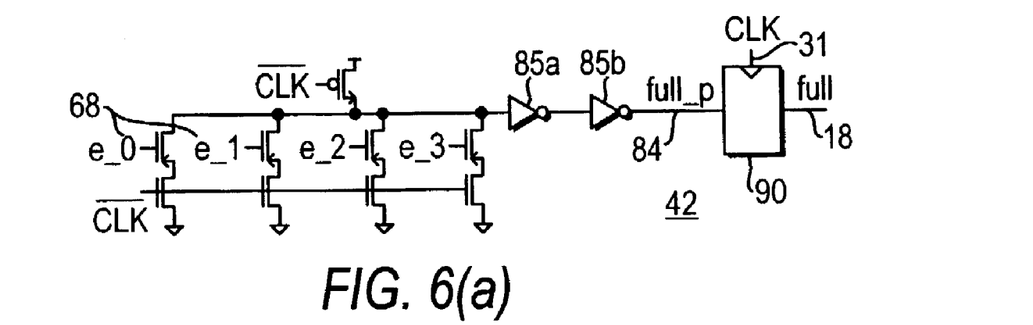
Figure 6B:
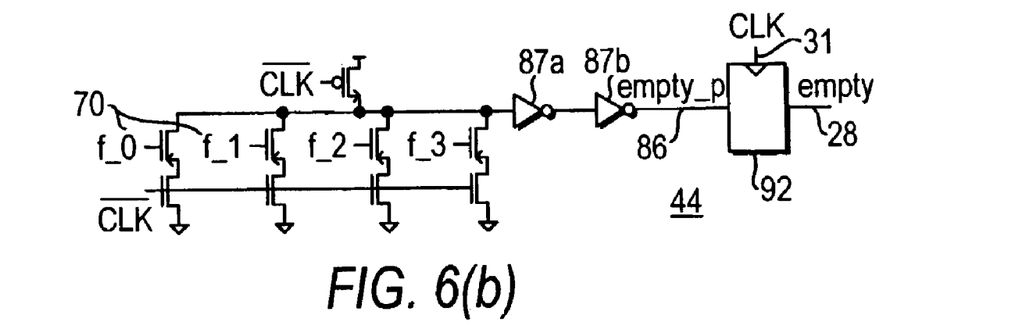

Dynamic logic implementations of the fill detector 42 and empty detector 44 for a 4-place FIFO are shown in FIGS. 6(a) and 6(c), respectively. The full detector 42, illustrated in FIG. 6(a) outputs one when there is no empty cell in the FIFO. The empty detector 44, illustrated in FIG. 6(b) outputs one when there is no full cell in the FIFO 10. In the precharge phase, both preliminary full signal 84 ($full_p$) and preliminary empty signal 86 (empty) are asserted to one (through two inverters 85a/85b and 87a/87b, respectively). In the evaluate phase, if no cell is full (all $f_i$=0), then preliminary empty signal 86 (empty) remains one. Otherwise, this value becomes zero. If no cell is empty (all $e_i$=0), then $full_p$ 84 remains one, otherwise it becomes zero. These values are latched on the next clock edge to full 18 and empty 28 through latch 90 and 92, respectively.

Figure 7:
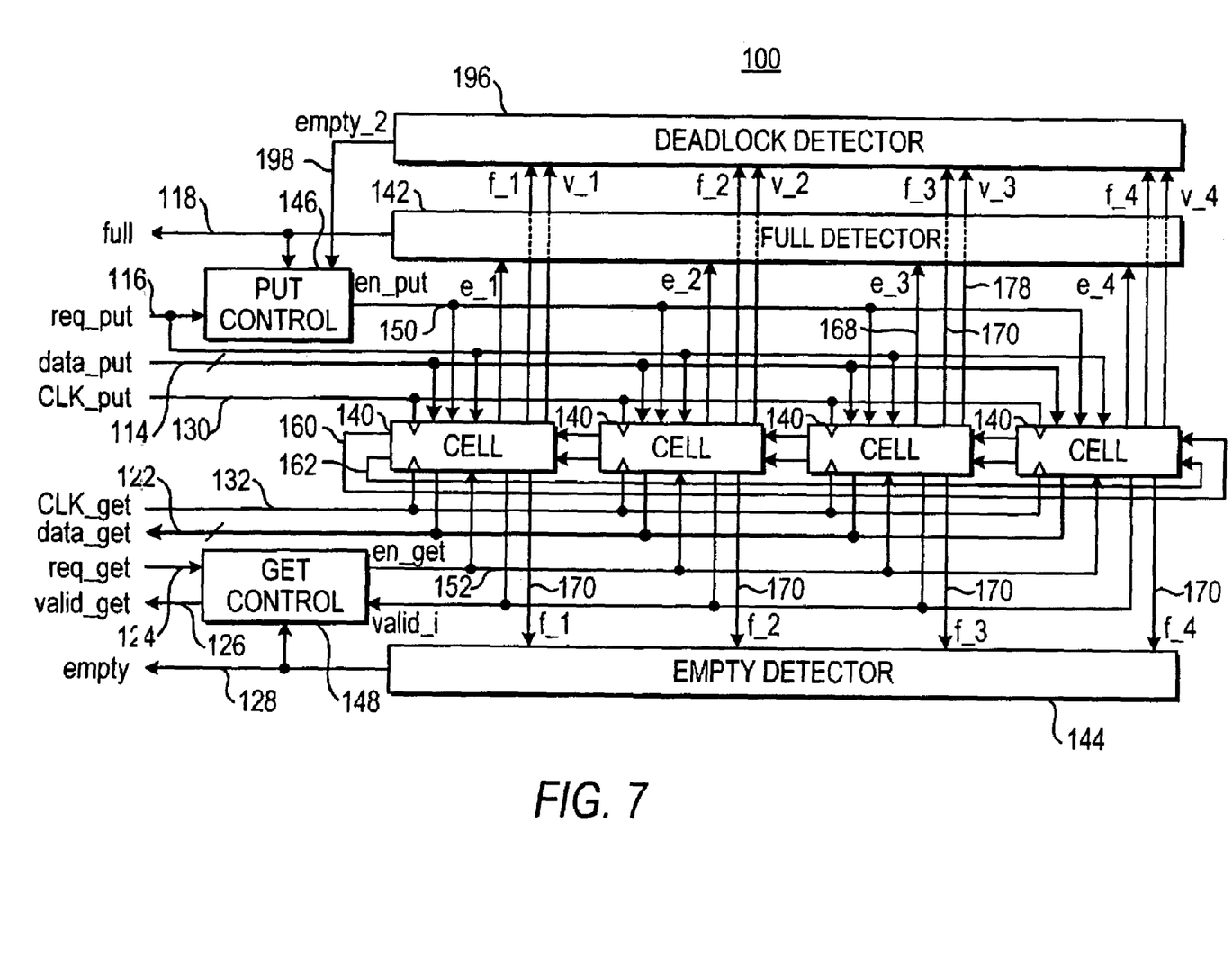
FIG. 7 is a schematic block diagram of another embodiment of the invention.

FIG. 7 illustrates another embodiment of the invention, FIFO 100, which is substantially similar to FIFO 10 described above with respect to FIGS. 2–6, with the differences noted herein. A significant feature of FIFO 100 is that it is controlled by two different clocks, rather than a single clock, as in FIFO 10. Consequently, there are several modifications to the external logic, as well as the addition of synchronizers. FIFO 100 avoids expensive data synchronization since only global control signals are synchronized, rather than each of the individual cells.

FIFO 10, described hereinabove, operates correctly with mixed-clock subsystems if the two interfaces are "cooperative". Interfaces are considered cooperative if they run at a similar pace and always maintain a few data items of separation in the FIFO. A data item can be safely enqueued into a cell because dequeuing takes place far away from that cell. The global control signals are computed quickly and remain stable.

In practice, however, the two interfaces will often not be cooperative and the FIFO may become empty or full. This situation potentially creates synchronization problems. For example, in the case in which the FIFO is full, the receiver may grab a data item making the FIFO not full at the moment in which the sender is reading the FIFO's state as full and is clocking the full signal 118. A problem is for the sender to see a "clean" full signal, i.e., synchronized to its own clock, and not the actual value of that signal. In such a case, if it sees a full FIFO, it conservatively stalls an extra clock cycle; if it sees the FIFO as not full, then it correctly proceeds.

A solution to this problem is to introduce synchronization on the global control signals. The full global control signal 118 and the empty global control signal 128 are now each synchronized to a single clock ($CLK_{put}$ 130 and $CLK_{get}$ 132, respectively). However, this synchronization in turn introduces additional latencies that may result in data inconsistencies (overflow and underflow). In order to compensate for these latencies, the definitions of "full" and "empty" are modified to detect when the FIFO is heading towards a full or empty state, and stop the respective interface in time.

An additional change in the design is necessitated by the new synchronization scheme. Introducing the early detection of empty creates the possibility that deadlock may occur. The receiver may be stalled when there still is a single valid data item in the FIFO 100. To avoid deadlock, both valid and invalid (dummy) data items may be enqueued. According to the design, a dummy data item may be enqueued by the FIFO 100 to prevent deadlock. Once the receiver restarts, no further dummy data items are used.

The two interfaces help each other to avoid metastable states: the sender helps the receiver by producing data items and moving the tail of the queue away from the head. The receiver helps the sender by consuming data items and creating space for depositing more data items.

The architecture of an embodiment of a mixed-clock FIFO 100 in accordance with the invention is illustrated in FIG. 7. FIFO 100 is substantially similar to FIFO 10, with four differences noted herein. First, two clocks, $CLK_{put}$ 130 and $CLK_{get}$ 132, are now controlling the interfaces rather than one clock CLK 31. Second, full detector 142 and empty detector 144 are modified from full detector 42 and empty detector 44, respectively, to incorporate synchronization. Third, since deadlock may arise in some special cases, a deadlock detector 196 is introduced. Fourth, the logic inside the put controller 146 and get controller 148 is modified from put controller 46 and get controller 48, respectively.

While not shown in FIG. 7, the two clocks control distinct portions of the FIFO 100. The passing of the put token is controlled by the sender's clock 130 ($CLK_{put}$), and the passing of the get token is controlled by the receiver's clock 132 ($CLK_{get}$). The full detector 142 is controlled by the sender's clock 130 ($CLK_{put}$) and the empty detector 144 is controlled by the receiver's clock ($CLK_{get}$) The newly introduced deadlock detector 196 is synchronized with the sender's clock 130 ($CLK_{put}$), as will be described in greater detail herein.

In accordance with the invention, the full signal 118 is re-synchronized to the sender's clock 130 ($CLK_{put}$), and the empty signal 128 is re-synchronized to the receiver's clock ($CLK_{get}$), by adding an extra latch to the output of each of the detectors (See, FIGS. 8(a)–8(b), below). These latches delay the output of signals by one clock cycle, which thereby resolves potential metastable states on the two control signals. While the design described herein adds a single latch, additional latches may be added to improve avoidance of metastability failures, and in this case, the three detectors (i.e., full detector 142, empty detector 144, and deadlock detector 196) must be modified accordingly The additional latency introduced by generating full and empty signals may result in FIFO overflow or underflow. For example, when the FIFO 100 becomes full, the sender interface is stalled two clock cycles later; so in the next clock cycle the sender might deposit a new data item, effectively overwriting a un-read data item. Conversely, when the FIFO becomes empty, the receiver interface is stalled two clock cycles later, so in the next clock cycle the receiver might read an empty cell.

As a result, for correct operation, the definitions of full and empty states in the FIFO 100 must reflect this configuration. Consequently, the FIFO 100 is considered "full" when there are either 0 or 1 empty cells left, and it is considered "empty" when there are either 0 or 1 cells filled. Thus, when there are fewer than 2 data items, the FIFO is declared empty. As a result, the receiver may then remove the last data item and issue a new (unacknowledged) request before stalling two clock cycles later. Similarly, when there are fewer than two empty cells, the FIFO 100 is declared full. In this case, the sender can safely deposit a final data item and issue a new (unacknowledged) request, before being stalled two clock cycles later. The definitions of "empty" and "full" in FIFO 100 do not require a change in the protocol with the two subsystems. The only effect is that sometimes the two subsystems see an n-place FIFO as and n–1 place FIFO.

Figure 8A:
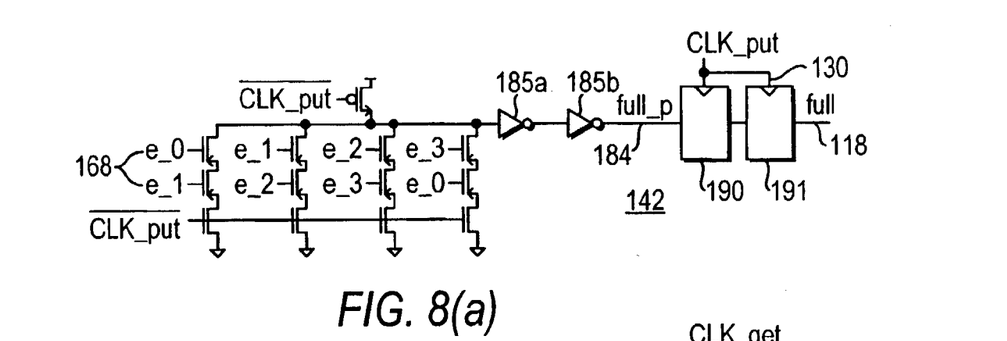
Figure 8B:
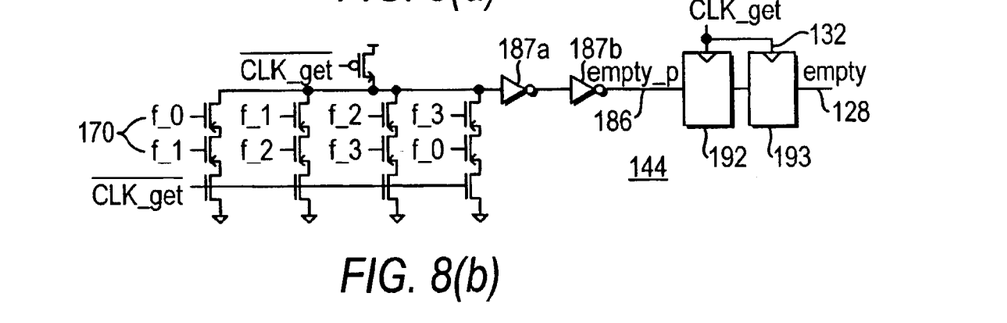
FIG. 8(b) is a schematic block diagram of an empty detector of the FIFO circuit illustrated in FIG. 7, in accordance with the invention.

The implementations of the full detector 142 and the empty detector 144, presented in FIGS. 8(a) and 8(b), respectively, correspond to the above definitions. More particularly, the FIFO 100 is considered full when there are no two consecutive cells empty. Consequently, the empty bits 68 for consecutive cells, e.g., $e\_0$ and $e\_1$, or $e\_1$ and $e\_2$, etc., are evaluated, and latch 191 is added to first latch 190 to delay the full signal 118. FIFO 100 is considered empty by empty detector 144 in FIG. 8(b) when there are not two consecutive cells full. Similarly, the full bits 70 for consecutive cells, e.g.,$f\_0$ and $f\_1$, or $f\_1$ and $f\_2$, etc., are evaluated, and latch 193 is added to first latch 192 to delay the empty signal 128.

Using the definition of empty, i.e., 0 or 1 data items remaining, it is possible that the FIFO 100 may still contain one valid data item and yet the requesting receiver is stalled. A solution in accordance with the invention is to detect this possibility of deadlock and reactivate the receiver so it can read the stored data item. In order to do so, a single dummy (i.e., invalid) data item is injected to signal the receiver that the FIFO 100 does not appear to be empty. The dummy data item is injected only when the FIFO 100 is both (1) declared "empty" by the empty detector 144, and (2) actually contains a single valid data item. After injecting the dummy data item, the empty detector will then see two data items in the FIFO 100 and restart the receiver. (This approach may be used even if the receiver is not requesting data items.)

Implementing this solution requires changes in the design of FIFO 100 when compared with FIFO 10. First, a deadlock detector 196 is introduced. Secondly, the put controller 146 and get controller 148 are modified from put controller 46 and get controller 48 in FIFO 10, as will be described in greater detail herein.

Figure 9:
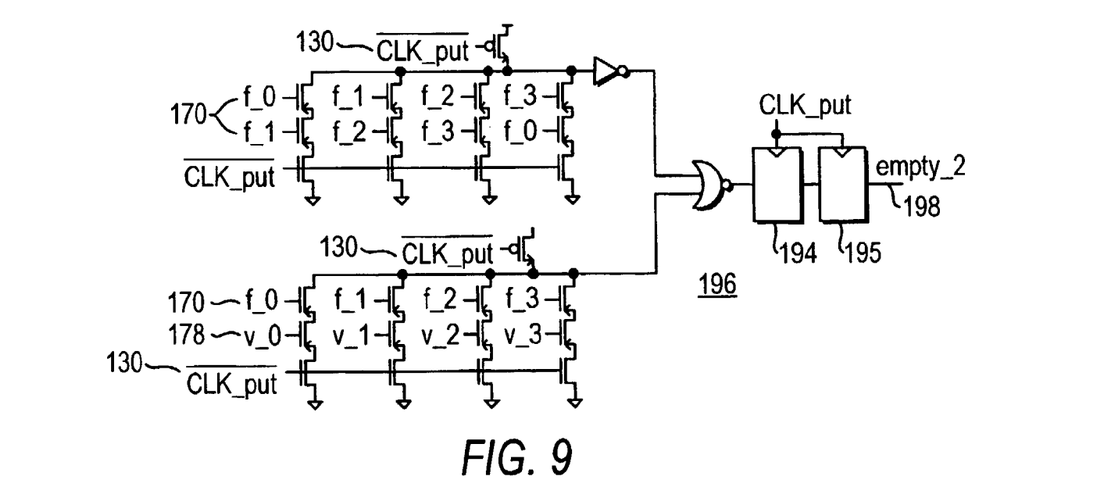
FIG. 9 is a schematic block diagram of a deadlock detector of the FIFO circuit illustrated in FIG. 7, in accordance with the invention.

A deadlock detector 196 is illustrated in FIG. 9, and implements the condition described above. More particularly, a deadlock output signal 198 ($empty_2$) =1 if the FIFO 100 is empty and at least one cell has a valid data item. The deadlock detector 196 looks for valid data items only in cells 140 that have their full bits 70 set also and have their data validity bits 78 set (See, FIG. 4). This prevents the deadlock detector 196 from using stale validity bits: one such bit can become stale because the REG 72 contents (including the validity bit) are not reset after its contents are dequeued.

If additional synchronization latches are desired to further reduce the possibility of meta-instability, these latches should be added to the full detector 142, the empty detector 144, and the deadlock detector 196, and the functions of detecting whether consecutive numbers of cells are empty or full should also be modified accordingly. For example, by adding an additional latch to latches 190/191 of full detector 142 (FIG. 8(a)), the full detector should be modified to determine whether three consecutive cells are empty, i.e., check empty bits $e\_0$, $e\_1$, $e\_2$, then $e\_1$, $e\_2$, $e\_3$, etc. In the same way, an additional latch should be added to latches 192/193 of empty detector 144 (FIG. 8(b)), and the empty detector should determine whether three consecutive cells are full, i.e., f__0, f__1, f__3, and f__1, f__2, f__3, etc. Finally, the deadlock detector 196 should be modified by adding an additional latch to latches 194/195 and by determining whether three consecutive cells are full, i.e., f__1, f__2, f__3, etc. The structure of the deadlock detector which determines whether there is one valid data item would remain unchanged regardless of the number of latches.

The output of the deadlock detector 196 controls the injection of dummy data items into a cell 140. The deadlock output signal 198 (empty$_2$) is fed into the put controller 146 which enables the enqueuing of a dummy data item. The detector's output is in turn synchronized through two ETD-FF's controlled by CLK$_{put}$. Once the dummy data item is injected, no further ones are injected since the output is deasserted (the FIFO is no longer appears empty since there are now two consecutive data items which will cause the input to 194 to be de-asserted).

Figure 10A:
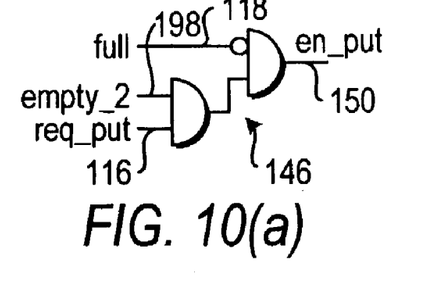
FIG. 10(a) is a schematic block diagram of a portion of the FIFO circuit illustrated in FIG. 7, in accordance with the invention.
Figure 10B:
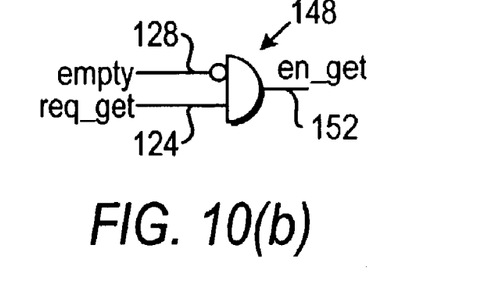
FIG. 10(b) is a schematic block diagram of another portion of the FIFO circuit illustrated in FIG. 7, in accordance with the invention.
Figure 10C:
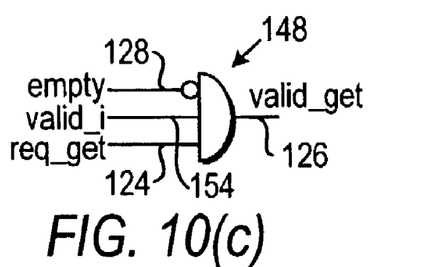
FIG. 10(c) is a schematic block diagram of a further portion of the FIFO circuit illustrated in FIG. 7, in accordance with the invention.

The put and get control logic must be configured to handle dummy data items. The put controller 146 (FIG. 10(*a*)) now enables the enqueuing of data items under two conditions: (a) the data item is valid (put data request 116 (req$_{put}$)=1), (b) a dummy item must be injected for deadlock prevention (empty$_2$=1 from the deadlock detector). The get controller 148 now distinguishes between both valid and invalid data items. Validity signal 126 (valid$_{get}$) is computed from the validity of the current dequeued data item.

The FIFO 100 works under many operating conditions. However, there are nevertheless some circumstances which warrant additional design considerations. A first case is when the FIFO operates at very fast clock frequencies, and metastable states on control cannot be solved in one clock cycle. The second case concerns large discrepancies between the sender's and receiver's clock frequencies.

In general, it is desirable to have high mean time between failures (MTBF). At low clock frequencies, using two latches for synchronization, as described above, is usually sufficient for good MTBF. At higher clock frequencies the MTBF provided by the two latches may be inadequate. The synchronization may be made more robust by adding more latches to the global control signal, e.g., full 118 and/or empty 128, having a poor MTBF. To compensate for each added latch, the FIFO should be declared full when there is one extra empty cell left and declare the FIFO empty when there is one extra full cell left, thus modifying the full or empty logic accordingly.

Large differences in clock speeds may cause malfunction in extreme cases. This malfunction may result from the early signaling of full/empty for a cell. As shown in FIG. 4 a cell's full/empty value (f$_i$ and e$_i$) is set asynchronously in the SR latch 75 during the clock cycle, but the data operation itself is only completed on the next clock edge. This optimization may cause problems when the relative clock rates of the two interfaces are very different.

This problem may arise, for example, if there are exactly two data items in the FIFO and the sender sends a new data item. At the beginning of the clock cycle, the tail cell is set to full, but the actual data will only be latched at the end of the clock cycle. However, if the clock frequency of the receiver is more than three times that of the sender, the receiver can quickly read the two intervening valid data items and access then the tail cell. In this case, it can then read the stale data from this cell and complete the get operation, before the sender has completed its clock cycle and latched the new data.

A solution is to modify the full or empty logic (whichever controls the faster interface) to stop the faster interface earlier. Let us suppose that the receiver is much faster than the sender. The definition of empty is modified as follows: the FIFO is empty when there are less than three full cells left. In this case, the receiver will stall before reading the last item, so no stale data will be dequeued.

Figure 10D:
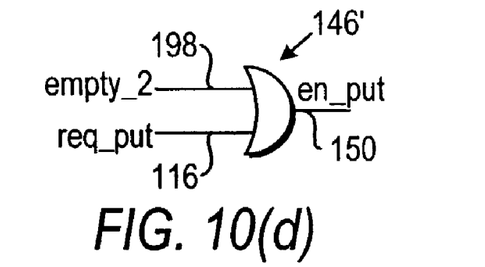
FIG. 10(d) is a schematic block diagram of an alternative embodiment of the invention.

An alternative embodiment of the invention is contemplated for a system which does not require a full detector, e.g., the rate of enqueuing data is not expected to result in all the cells of the FIFO being filled. In such a case, the FIFO would be modified as illustrated in FIG. 10(*d*), wherein the put controller 146' will perform an OR function on empty$_2$ 198 and req$_{put}$ 116, without incorporating the full signal 118. In addition, the empty bits e_i 68, would not be used in this embodiment. In all other respects, this embodiment would operate substantially the same as FIFO 100.

Figure 11A:
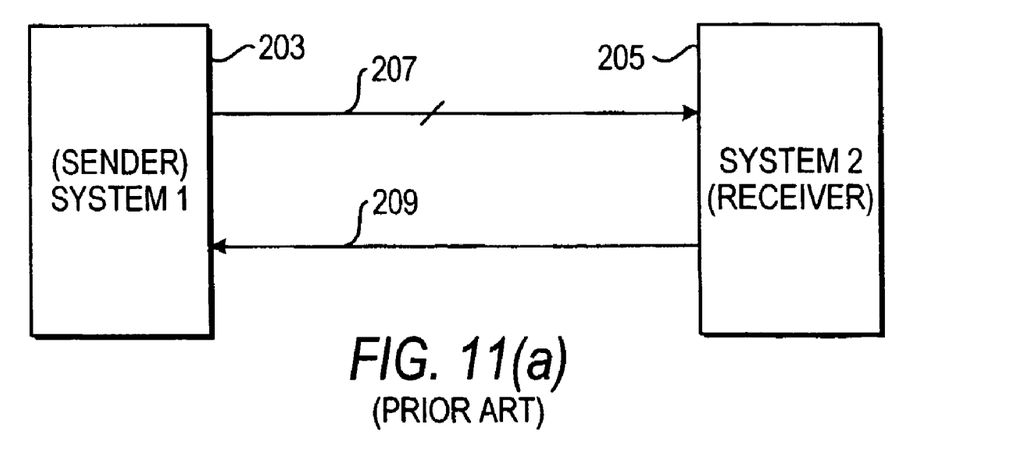
FIG. 11(a) is schematic block diagram of another embodiment of the invention.
Figure 11B:
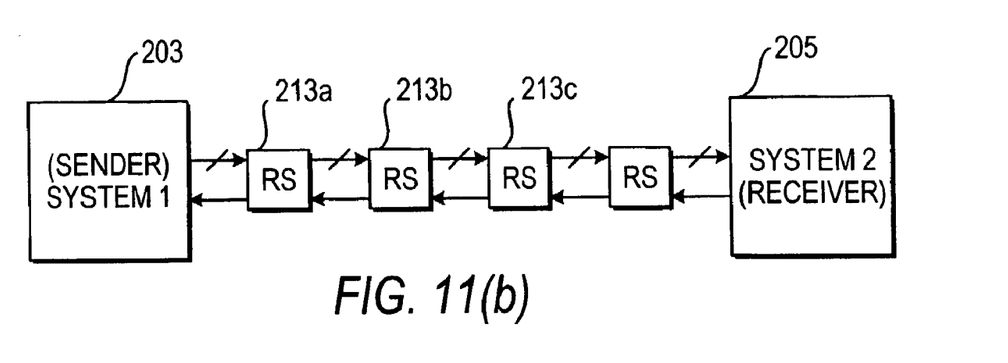
FIG. 11(b) is a more detailed schematic block diagram of a portion of the circuit illustrated in FIG. 11(a), in accordance with the invention.

The first problem of subsystems operating at different clock speeds has been addressed with respect to the embodiment of FIGS. 7–11. The second problem of subsystems concerns there are long communication delays on wires between subsystems. Relay stations were introduced to address the connection delay penalties between two subsystems, e.g. sender subsystem 203 and receiver subsystem 205, operating under the same clock. After placement, the systems may be connected by very long wires, 207/209 on which a signal takes several clock cycles to travel (See, FIG. 11(*a*)). A solution in accordance with the invention is be to break the long wires 207/209 into segments corresponding to clock cycles, and then insert a chain of relay stations 213*a*/213*b*/213*c* which act like a FIFO sending packets from one system to another, as illustrated in FIG. 11(*b*).

Figure 11C:
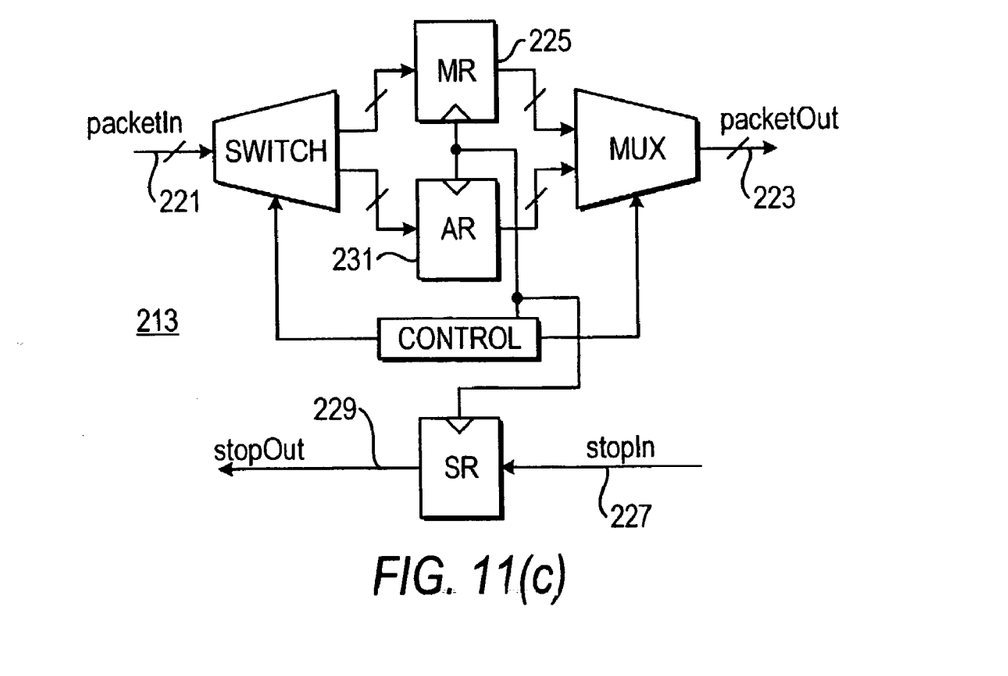

An implementation of a relay station 213*a*/213*b*/213*c* is illustrated in FIG. 11(*c*) in conjunction with FIG. 11(*b*), as is known in the art. Normally, the packets from the left relay station 213*a* are passed to the right relay station 213*b*. The right relay station 213*b* also has the possibility to put counter-pressure on the data flow by stopping the relay stations to the left. Each relay station has two registers: a main register 225 is used in normal operation and an auxiliary register 231 used to store an extra packet when stopped.

Relay station 213*a*/213*b*/213*c* works as follows. During normal operation, at the beginning of every clock cycle, the data packet received on packetIn 221 to relay station 213*b* from the left relay station 213*a* (shown in FIG. 11(*b*)) is copied to the main register 225 (MR) and then forwarded on packetOut 223 to the right relay station 213*c* (shown in FIG. 11(*b*)). A packet consists of a data item and a valid bit which indicates the validity of the data in the packet. If the receiver system wants to stop receiving data, it raises stopIn 227. On the next clock edge, the relay station 213*b* raises stopOut 229 and latches the next packet to the auxiliary register 231 (AR). When the relay station 213*b* is un-stalled, it will first send the packet from the main register 225 to the right, and then the one from the auxiliary register 231.

Figure 12:
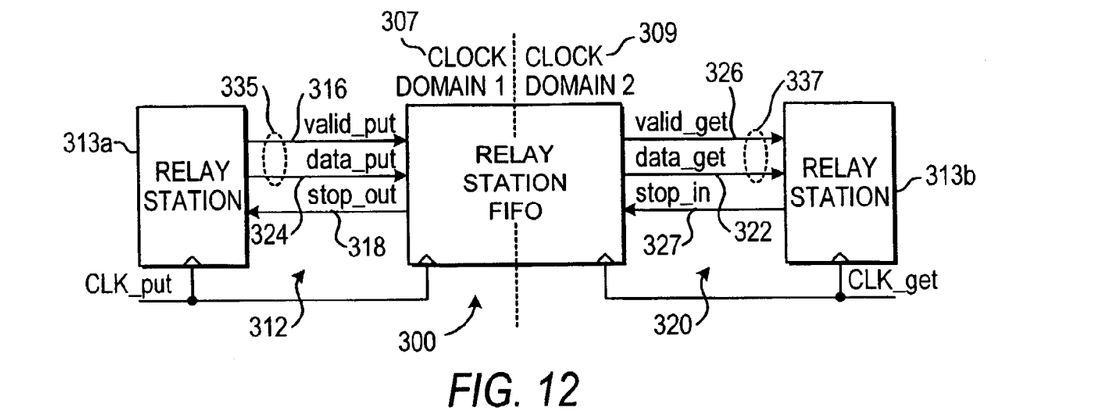
FIG. 12 is a schematic block diagram of a further embodiment of the invention.
Figure 13:
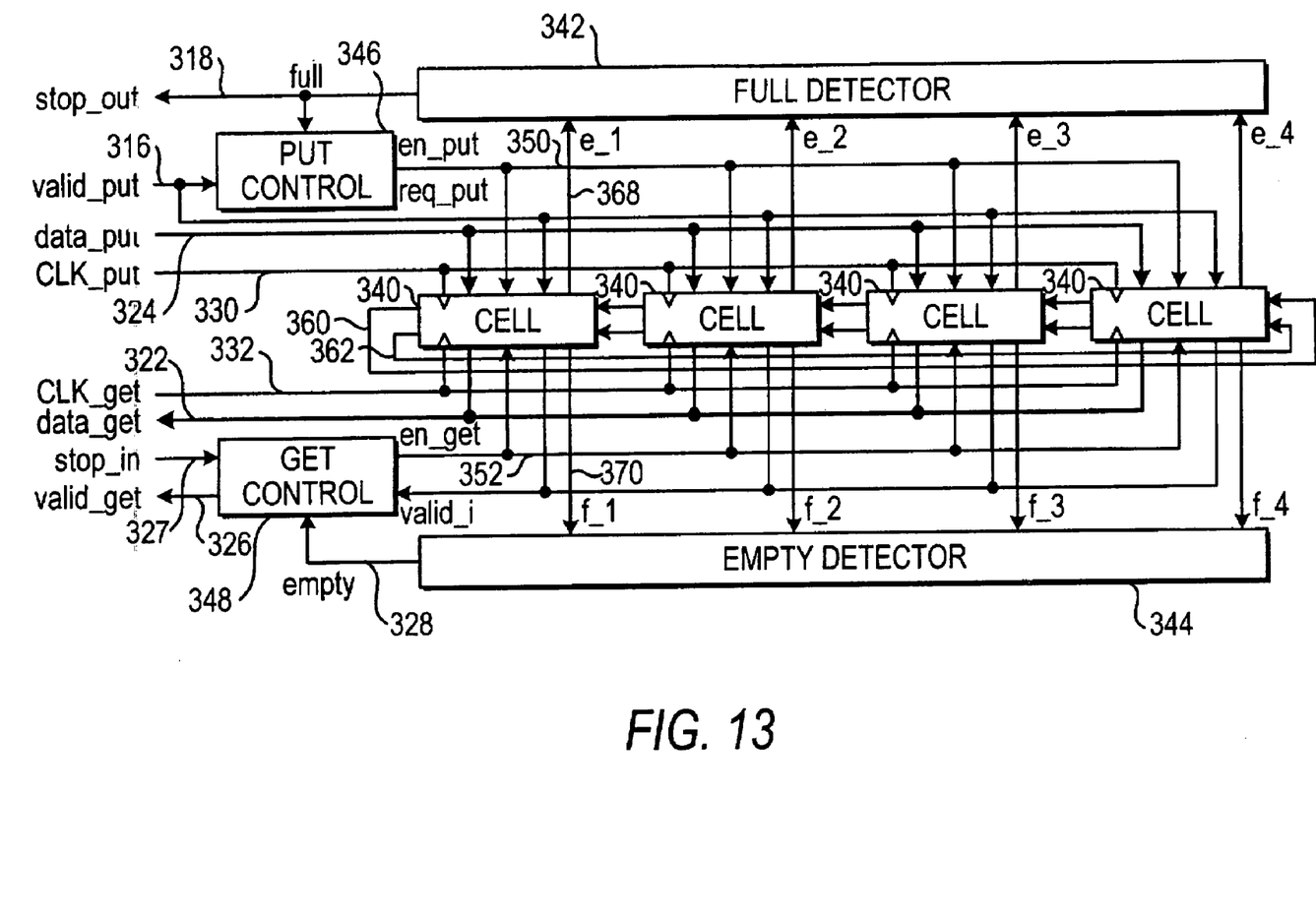
FIG. 13 is a schematic block diagram of a further embodiment of the invention.
Figure 14A:
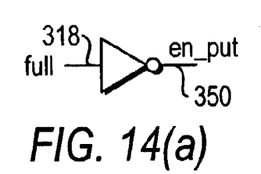
FIG. 14(a) is a more detailed schematic block diagram a portion of the circuit illustrated in FIG. 12, in accordance with the invention.
Figure 14B:
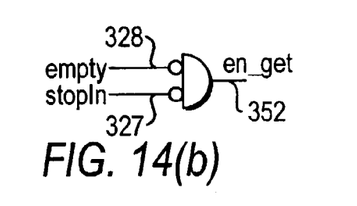
FIG. 14(b) is a more detailed schematic block diagram of another portion of the circuit illustrated in FIG. 12, in accordance with the invention.
Figure 14C:
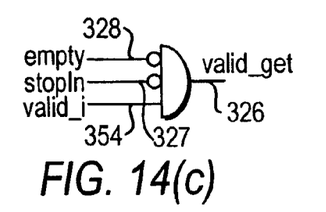
FIG. 14(c) is a more detailed schematic block diagram of a further portion of the circuit illustrated in FIG. 12, in accordance with the invention.

In accordance with the invention, a relay station 213*a*/213*b*/213*c* may be replaced by an additional embodiment of the invention, referred to FIFO 300 and illustrated in FIGS. 12–14. FIFO 300 is substantially identical to the mixed-clock FIFO 100 described above with respect to FIGS. 7–10, with the differences noted herein. FIFO 300 is a modification of FIFO 100, which incorporates features useful to accommodate long interconnect delays. FIFO 300 replaces one relay station and interfaces between left and right relay chains 313*a* and 313*b*. Relay stations 313*a* and 313*b* are substantially identical to relay station 213, as described above with respect to FIG. 11(*c*). Each relay chain 313*a* and 313*b* may be operated under a different clock, e.g. relay station 313a operates under first clock domain 307, and relay station 313b operates under second clock domain 309.

In contrast to the mixed-clock FIFO 100, the FIFO 300 always passes (valid or invalid) data items from left to right: there are no active requests on either interface. Instead, the get and put interfaces can only actively stop, or interrupt, the continuous flow of data items. Data items and validity signals pass into FIFO 300 on packetIn 335, and data items and validity signals pass out of FIFO 300 on packetOut 337. The get interface 320 reads a data item from the FIFO 300 on every clock cycle. The flow of data is stopped by asserting stopIn 327. Similarly, the FIFO 300 always enqueues data items from the put interface 312. Unlike the previous embodiments described above, $valid_{put}$ 316 is used solely to indicate data validity, being treated as part of packetIn 335 and not as a control signal. The signal $valid_{put}$ 316 is connected to every cell as the $req_{put}$ input, indicating the validity of the data on $data_{put}$ 324, but does not connect to the put controller 346. When it becomes full, the FIFO 300 simply stops the put interface 312. The full signal 318 (shown in FIG. 13) is implemented substantially as for FIFO 100 and is used as stopOut 318 to the left interface.

The new FIFO 300 can be easily derived from the mixed clock FIFO 100 described above with several modifications as noted herein. With respect to FIG. 13, the full detector 342 and the empty detector 344 are implemented substantially identically as the full detector 142 (see, FIGS. 7 and 8(a)) and the empty detector 144 (see, FIGS. 7 and 8(b)) to determine the number of empty bits e_i 368 and full bits f_i 370 in each of cells 340. The put controller 146 and get controller 148, which were described above with respect to FIFO 100, have been modified for FIFO 300. In FIFO 100, the put controller 146 enables both the injection of dummy data items and the enqueuing of valid ones (thus using both $empty_2$ 198 and $req_{put}$ 116 signals). In contrast, the relay-station design FIFO 300 simply allows both dummy and valid data items to pass through. When compared with the single-clock FIFO 10, wherein the put controller 46 only enables insertion of data items on demand, i.e. using the put request input 16 ($req_{put}$), put controller 346 of FIFO 300 continuously enqueues data items unless the FIFO becomes full. Thus, the put controller 346 produces an output of the global put signal 350 ($en_{put}$) by use of an inverter on the full signal 318 (full) (See, FIG. 14(a)). Similarly, get controller 348 enables continuous dequeuing of data items, unlike the mixed-clock FIFO 100, in which dequeuing was done on demand. As illustrated in FIG. 14(b), dequeuing can only be interrupted if the FIFO 300 becomes empty (empty signal 328 (empty) high) or the get interface signals it can no longer accept data items by asserting stopIn 327. As illustrated in FIG. 14(c), the get controller 348 produces the validity signal 326 ($valid_{get}$) by incorporating the stopIn 327 signal.

Finally, note that a relay-station FIFO 300 does not deadlock. The put interface 312 enqueues a data item (valid or invalid) on every clock cycle, meaning that the FIFO 300, if "empty", becomes "non empty" immediately. After the synchronization through the empty detector, the get interface is thus able to read the stream of data items. Until it is restarted, the get interface simply "reads" void data items. In summary, since the get interface always restarts, the deadlock detector is removed from the design.

EXAMPLE

In order to evaluate the performance of the various FIFO designs presented in this paper, the circuits were simulated using HSpice (© Avant! Corporation), assuming implementation in 0.6 μm HP CMOS technology at 3.3V at and 300K.

The behavior of a FIFO of capacity 8, with a data item of width 8 was simulated. For $en_{put}$, $req_{put}$, $en_{get}$ and $data_{put}$, buffering was used to drive the capacitance of all cells. For $valid_i$ and $data_{put}$, in addition to the load provided by the appropriate latching/result logic, a load contributed by long wires was modeled. The wire load was estimated to be equivalent to two inverters per cell.

The results for the maximum clock frequencies at which each circuit can be clocked are presented in Table 1.

TABLE 1

| Maximum clocking frequencies | | |
|---|---|---|
| Version | $CLK_{in}$ | $CLK_{out}$ |
| Single Clock 10 | 584 MHz | |
| Mixed Clocks 100 | 523 MHz | 554 MHz |
| Relay Station 300 | 562 MHz | 552 MHz |

All of the designs were clocked to over 500 MHz. The somewhat lower performance of the mixed-clock FIFO 100 is due in part to the increased complexity of the empty and $empty_2$ logic. Although the mixed-clock and the relay station designs are very similar, the performance of the latter is better due to the elimination of the $empty_2$ circuitry and the decreased complexity of the put controller.

It will be understood that the foregoing is only illustrative of the principles of the invention, and that various modifications can be made by those skilled in the art without departing from the scope and spirit of the invention.

What is claimed is:

1. A FIFO circuit which interfaces the transmission of a data item from a sender subsystem controlled by a first clock signal to a receiver subsystem controlled by a second clock signal, comprising:
   an array of cells for storage of data items, wherein each cell is configured to enqueue a data item received from the sender subsystem and to dequeue the data item to the receiver subsystem;
   an empty detector which produces a first empty control signal synchronized with the second clock signal which is asserted when fewer than a predetermined number of consecutive cells in the array of cells are full; and
   a deadlock detector which produces a second empty control signal synchronized with the first clock signal which is asserted when fewer than the predetermined number of cells in the array of cells are full and at least one cell in the array of cells has a valid data item.

2. The FIFO circuit as recited in claim 1, further comprising:
   a get controller configured to enable the dequeuing of a data item when the receiver subsystem requests the data item be dequeued and the first empty signal is not asserted.

3. The FIFO circuit as recited in claim 2, further comprising:
   a full detector which produces a full control signal synchronized with the first clock signal which is asserted high when fewer than a second predetermined number of consecutive cells in the array of cells are empty; and a put controller configured to enable the enqueuing of an invalid data item when the full signal is not asserted, the second empty signal is asserted, and the sender subsystem does not request a data item to be enqueued.

4. The FIFO circuit as recited in claim 3, wherein the put controller is configured to enqueue a valid data item when the sender subsystem requests a data item be enqueued and the full signal is not asserted.

5. The FIFO circuit as recited in claim 4, wherein the full signal and the second empty signal are the only signals synchronized with the first clock signal and the first empty signal is the only signal synchronized with the second clock signal.

6. The FIFO circuit as recited in claim 1, wherein the first clock signal has a different clock frequency than the second clock signal.

7. The FIFO circuit as recited in claim 1, wherein the full control signal is synchronized to the first clock signal by the addition of a latch to the full detector.

8. The FIFO circuit as recited in claim 1, wherein the second empty control signal is synchronized to the first clock signal by the addition of a latch to the deadlock detector.

9. The FIFO circuit as recited in claim 1, wherein the first empty control signal is synchronized to the second clock signal by the addition of a latch to the empty detector.

10. A method for transmitting a data item with a FIFO circuit, having an array of cells for storage of data items, wherein each cell is configured to enqueue a data item received from a sender subsystem controlled by a first clock signal and to dequeue the data item to a receiver subsystem controlled by a second clock signal, comprising:

asserting a full control signal synchronized with the first clock signal when fewer than a first predetermined number of consecutive cells in the array of cells are empty;

asserting an empty control signal synchronized with the first clock signal when fewer than a second predetermined number of consecutive cells in the array of cells are full and the there is at least one valid data item in the array of cells;

receiving a request from the sender subsystem to enqueue a valid data item;

enqueuing the valid data item if the full control signal has not been asserted and a request to enqueue the valid data item from the sender subsystem has been received; and enqueuing a dummy data item if the full control signal has not been asserted, the empty control signal has been asserted, and the request to enqueue the valid data item from the sender subsystem has not been received.

11. The method recited in claim 10, further comprising:

asserting a second empty control signal synchronized with the second clock signal when fewer than a second predetermined number of consecutive cells in the array of cells are full;

receiving a request from the receiver subsystem to dequeue a data item; and dequeuing a data item if the second empty control signal has not been asserted.

* * * * *